(12) United States Patent
Rathmacher et al.

(10) Patent No.: US 8,717,197 B2
(45) Date of Patent: May 6, 2014

(54) METHOD FOR ASSESSING DRIVER ATTENTIVENESS

(75) Inventors: Ralf Rathmacher, Schmitten im Taunus (DE); Thomas Schramm, Mainz (DE); Oliver Schepp, Idstein (DE)

(73) Assignee: GM Global Technology Operations LLC, Detroit, MI (US)

( * ) Notice: Subject to any disclaimer, the term of this patent is extended or adjusted under 35 U.S.C. 154(b) by 249 days.

(21) Appl. No.: 13/277,316

(22) Filed: Oct. 20, 2011

(65) Prior Publication Data
US 2012/0098678 A1   Apr. 26, 2012

(30) Foreign Application Priority Data
Oct. 21, 2010   (DE) .......................... 10 2010 049 086

(51) Int. Cl.
| G08G 1/017 | (2006.01) |
| G08G 1/01 | (2006.01) |
| B60Q 1/00 | (2006.01) |
| G08B 23/00 | (2006.01) |
| G06K 9/00 | (2006.01) |
| B60D 1/28 | (2006.01) |

(52) U.S. Cl.
USPC ........... 340/937; 340/933; 340/439; 340/575; 382/104; 180/271

(58) Field of Classification Search
USPC ......... 340/937, 933, 439, 575–576, 435–436; 382/104, 159; 180/271–272
See application file for complete search history.

(56) References Cited

U.S. PATENT DOCUMENTS

| 5,642,093 | A  | * | 6/1997  | Kinoshita et al. | ............. 340/439 |
| 6,304,187 | B1 | * | 10/2001 | Pirim | ............................. 340/576 |
| 6,732,021 | B2 | * | 5/2004  | Matsumoto et al. | ............... 701/1 |
| 7,084,772 | B2 |   | 8/2006  | Oyama | |
| 7,152,000 | B2 |   | 12/2006 | Ihara et al. | |
| 7,411,486 | B2 | * | 8/2008  | Gern et al. | ..................... 340/438 |
| 7,719,431 | B2 | * | 5/2010  | Bolourchi | ..................... 340/576 |
| 7,782,179 | B2 | * | 8/2010  | Machii et al. | ................. 340/435 |

(Continued)

FOREIGN PATENT DOCUMENTS

| DE | 102005012196 A1 | 3/2006 |
| DE | 102005017242 A1 | 10/2006 |

(Continued)

OTHER PUBLICATIONS

German Patent Office, German Search Report for Application No. 102010049086.5, dated Aug. 10, 2011.

(Continued)

*Primary Examiner* — Jennifer Mehmood
*Assistant Examiner* — Omar Casillashernandez
(74) *Attorney, Agent, or Firm* — Ingrassia Fisher & Lorenz, P.C.

(57) ABSTRACT

A method is provided for assessing the attentiveness of the driver of motor vehicle traveling in a lane including, but not limited to detecting the position of the motor vehicle on the lane transverse to the direction of travel, determining the extent of fluctuations of the position, and assessing the attentiveness as insufficient if within an observation period at least one first significant period is detected in which the extent of fluctuations of the position falls below a first low limiting value and a second significant period is detected in which the extent of the fluctuations exceeds a second high limiting value.

17 Claims, 3 Drawing Sheets

(56) References Cited

U.S. PATENT DOCUMENTS

| | | | |
|---|---|---|---|
| 7,982,618 B2* | 7/2011 | Omi et al. | 340/573.1 |
| 2004/0035631 A1 | 2/2004 | Schlecht et al. | |
| 2005/0030184 A1* | 2/2005 | Victor | 340/576 |
| 2008/0291276 A1* | 11/2008 | Randler | 348/149 |
| 2009/0322506 A1 | 12/2009 | Schmitz | |
| 2010/0039249 A1* | 2/2010 | Schmitz et al. | 340/439 |
| 2010/0191422 A1 | 7/2010 | Reichert | |
| 2010/0194887 A1* | 8/2010 | Ono et al. | 348/148 |

FOREIGN PATENT DOCUMENTS

| | | |
|---|---|---|
| DE | 102006051930 A1 | 5/2008 |
| DE | 102007001362 A1 | 7/2008 |
| EP | 1510395 A2 | 3/2005 |

OTHER PUBLICATIONS

UK IPO, British Search Report for Application No. 1117236.8, dated Jan. 31, 2012.

* cited by examiner

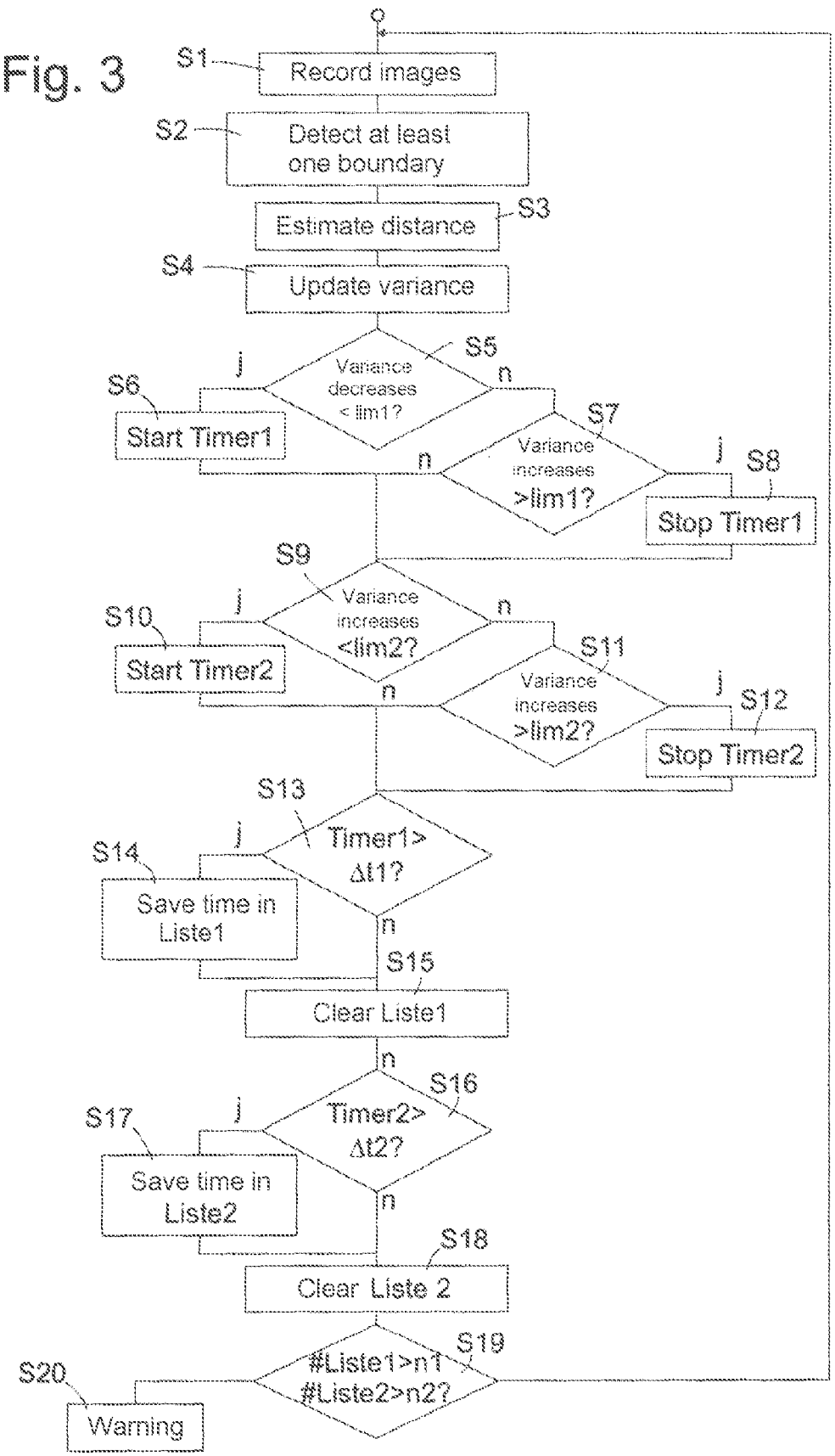

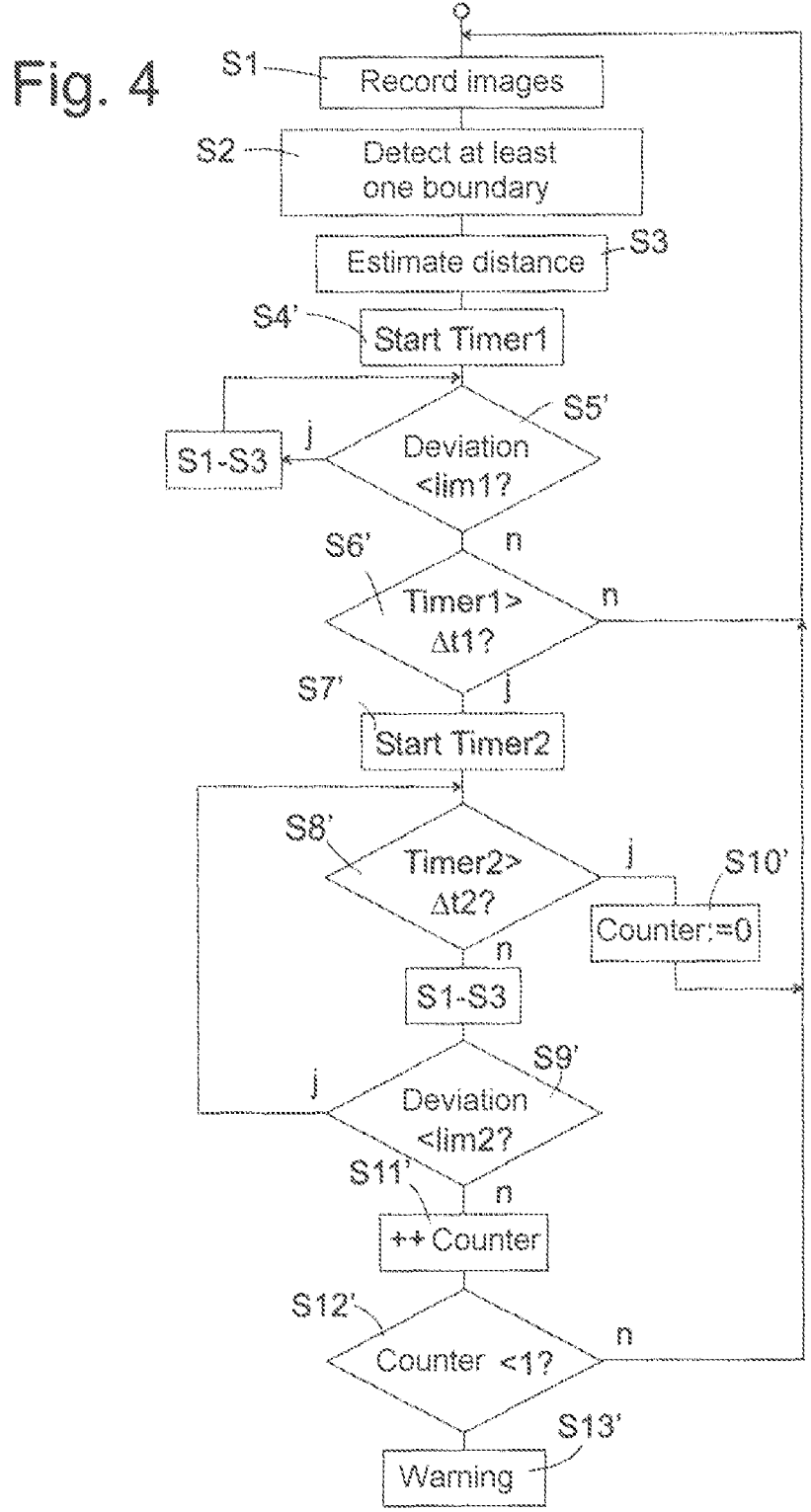

METHOD FOR ASSESSING DRIVER ATTENTIVENESS

CROSS-REFERENCE TO RELATED APPLICATION

This application claims priority to German Patent Application No. 102010049086.5, filed Oct. 21, 2010, which is incorporated herein by reference in its entirety.

TECHNICAL FIELD

The technical field relates to a method and means for assessing the attentiveness of the driver of a traveling motor vehicle.

BACKGROUND

Apparatuses and methods for monitoring the steering activities of the driver of a motor vehicle in order to assess their quality and by means of the assessment to estimate the level of attentiveness of the driver and if necessary generate a warning, are known from numerous publications. DE 10 2005 012 196 A1 describes a method in which an image of the roadway lying ahead of the vehicle is recorded with the aid of a camera built in a vehicle, a lane boundary is determined in the image, and the distance of the vehicle from the lane boundary is estimated. It is assumed here that as long as the driver does not fall asleep at the wheel a zigzag movement of the vehicle is usually prevented and a measure for the intensity of the zigzag movement is almost zero. However, if the driver falls asleep during driving, it is assumed that the vehicle moves along a zigzag line so that in this case, a warning device should be actuated.

A problem with this known technique is that the driver "falling asleep for a second", which is the cause of numerous accidents, frequently occurs unexpectedly and when it has occurred, the driver is no longer able to maintain a zigzag course but deviates directly from the lane. In such a case, no warning that could wake the driver and enable a correcting steering movement takes place.

Therefore, at least one object is to further develop the conventional method for assessing the attentiveness of a driver in order to improve its practicality and reliability. In addition, other objects, desirable features and characteristics will become apparent from the subsequent summary and detailed description, and the appended claims, taken in conjunction with the accompanying drawings and this background.

SUMMARY

A method is provided that comprises detecting the position of the motor vehicle in its lane transverse to the direction of travel; determining the extent of fluctuations of the position of the vehicle; assessing the attentiveness of the driver as insufficient if within an observation period at least one first significant period in which the extent of fluctuations of the position exceeds a first low limiting value and a second significant period are detected in which the extent of the fluctuations exceeds a second high limiting value.

This method takes account of the fact that before the actual onset of the falling asleep for a second, phases in which the driver can still apply the necessary attentiveness to keep the vehicle exactly on track alternate with phases in which he only manages this to a limited extent. In these latter phases the response time of the driver is slowed so that a more severe movement of the vehicle in the lane transverse direction is possible before the driver counter-steers. If the assessment of the attentiveness is exclusively based on the extent of the approach, the distance from the lane boundary below which a warning is triggered must be set very low in order to avoid the driver and possibly passengers of the vehicle from becoming irritated by incorrect warnings. Since, however, not the pure extent of the positional fluctuations is detected but a pattern in which these fluctuations vary, the reliability of the assessment can be significantly improved and in particular a limiting value above which a high extent of fluctuations is established can be set sensitively in order to detect a slowing reaction speed of the driver caused by fatigue even when the positional fluctuations caused thereby are not yet so large that a deviation from the lane can be feared immediately.

The benchmark for the fluctuations can be defined in various ways. For example, it can be counted how often within a predefined time interval a predefined distance from the lane boundary is fallen below or the differences between successive maxima and minima of this distance can be evaluated. The benchmark can also be defined differently for comparison with the first and the second limiting value.

A particularly expedient benchmark of the fluctuations within the framework of a first embodiment, in particular for comparison with the first limiting value, is the variance of the position, where within the framework of the present invention, no distinction is made between the variance in the sense of the mathematical statistics and quantities derived therefrom such as the standard deviation. In particular for comparison with the second limiting value, as a result of a second embodiment of the method the maximum of the deviation of the position (d) from a mean value can be used.

The observation period can, in particular within the framework of the afore-mentioned first embodiment, be fixedly predefined; its beginning and end can however also, preferably within the framework of the second embodiment, be determined by observation results as explained hereinafter in further detail.

As a result of the first embodiment, a first and/or second period is expediently assessed as significant whenever its duration exceeds a predefined first or second significance limiting value. As a result of a second embodiment, a period, in particular the second period can always be assessed as significant if the time between the beginning of the period and the time at which the deviation exceeds the limiting value is smaller than the significance limiting value.

The aforementioned observation result that can have the result that an observation period ends can in particular be the fact that a time interval adjoining a significant first period does not fulfill criteria for a significant second period.

Since the method is designed to detect the fluctuations in attentiveness which occur before the onset of the falling asleep for a second and not the falling asleep for a second itself, it is not absolutely essential to assess the attentiveness as insufficient when the exceeding of the second limiting value during a significant period is detected one single time. On the contrary, the number of significant first periods and/or the number of significant second periods which must be detected before an attentiveness deficiency of the driver is determined is at least two. This allows in particular the second limiting value to be set low, in order to detect critical attentiveness fluctuations with a high probability without thereby accepting at the same time a high number of incorrect assessments. If the attentiveness is assessed as insufficient, a warning should be given to the driver which either can be effective by itself alone in order to restore the attentiveness or which can cause the driver to take a break from driving.

In order to detect the position of the motor vehicle, at least one camera is preferably carried on the vehicle which records images of the lane. A determination of position in the transverse direction of the lane can be made whereby at least one lane boundary is identified in the images delivered by the at least one camera and the distance of the vehicle from the lane boundary is estimated by reference to the identified lane boundary. Such a detected lane boundary can be used directly as a reference for detecting the position of the motor vehicle. Such a method certainly has the advantage of simplicity but is not able to distinguish an approach of the vehicle to the lane boundary caused by narrowing of the lane from an approach caused by steering, so that there is an increased risk of an incorrect assessment when entering into a narrow lane section.

As a result of a preferred further development, a right and a left lane boundary is identified in the images. A lane center can be determined using these identified lane boundaries and these are used as a reference to detect the position of the motor vehicle. Since with an attentive driver, the position of the vehicle relative to the lane center on entering into a narrow lane section will vary less than the position relative to a lane boundary, the risk of incorrect assessments is reduced here. If the lane width is estimated using the identified lane boundaries, it is further possible to determine the first and/or second limiting value using the lane width and thus take account of the fact that on a narrow lane only relatively small positional deviations can be tolerated and an attentive driver usually takes account of this fact by driving more slowly on a narrow lane in order to accordingly control the position more accurately.

An onboard computer is further provided for a motor vehicle that is set up to execute the method described above and a computer program product with program code means which enable a computer to execute the method described above.

BRIEF DESCRIPTION OF THE DRAWINGS

The present invention will hereinafter be described in conjunction with the following drawing figures, wherein like numerals denote like elements, and:

FIG. 3 shows a flow diagram of a method executed in an onboard computer of the vehicle from FIG. 1 for assessing the driver attentiveness according to a first embodiment of the method; and FIG. 4 shows a flow diagram of a method executed in an onboard computer of the vehicle from FIG. 1 for assessing the driver attentiveness according to a second embodiment of the method.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
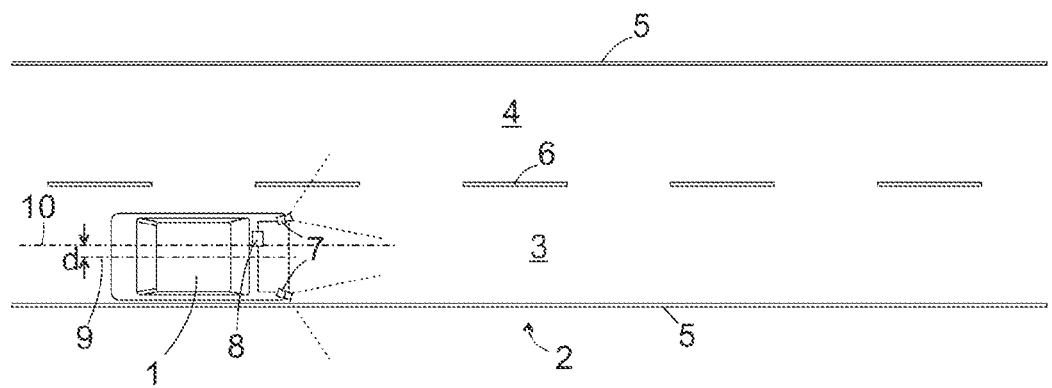
FIG. 1 shows a schematic view of an application situation of the method according to an embodiment.

FIG. 1 shows in a schematic plan view a motor vehicle 1 traveling on a road 2. Two lanes 3, 4 of the road 2 are each marked by a continuous outer boundary line 5 and a broken center strip 6. The vehicle 1 has two cameras aligned obliquely forward in the direction of travel for detecting the boundary line 5 adjacent to lane 3 of the vehicle and the center strip 6. It would also be feasible to attach a single camera centrally on the vehicle in order to image both the boundary line 5 and the center strip 6 in a single image of this camera.

An onboard computer 8 of the vehicle is programmed to identify the center strip 6 or the boundary line 5 of the lane 3 in the images of the camera 7 using methods of pattern recognition known per se. Using the known alignment of the camera 7 relative to the lane longitudinal direction and the position of the detected boundary line 5 or the center strip 6 in the delivered images, the onboard computer 8 calculates the distance of the vehicle from the boundary line 5 or from the center strip 6. A reference point relative to which the distance is calculated can be a flank of the motor vehicle body facing the relevant lane boundary 5 or 6 or an arbitrary other point which can be determined arbitrarily on the vehicle 1.

The images are recorded with a predefined repetition frequency which can be determined according to the processing capacity of the onboard computer 8 and is preferably several Hz. Measured values of the position d of the motor vehicle 1 in the transverse direction of its lane 3 are thus obtained in periodic time intervals by means of the images. FIG. 1 shows as an example as position d the distance between a longitudinal central plane 9 of the vehicle 1 and a center line 10 of the lane 3.

The measured values of the position d can be handled in the onboard computer 8 in different form. One possibility is to derive two position values from each of the pair of images delivered by the camera 7 which each give the distance from the left lane boundary i.e. the center strip 6 or the right lane boundary, the boundary line 5 in order to evaluate these two position values independently of one another in the manner described in more detail hereinafter. An advantage of this approach is that the calculation and evaluation of one of the two position values can be temporarily suspended if the road being driven lacks the boundary line 5 or the center strip 6 or this cannot be identified.

Another approach is to calculate the width of the lane 3 from two distance values obtained from each pair of images and the lateral offset of a reference point of the vehicle 1 from the lane center. It is feasible to calculate and specify the position of the vehicle 1 as the distance from one of the two lane boundaries and to use the measurement of the lane width merely to determine limiting values lim1, lim2 explained in further detail in the following.

Figure 2:
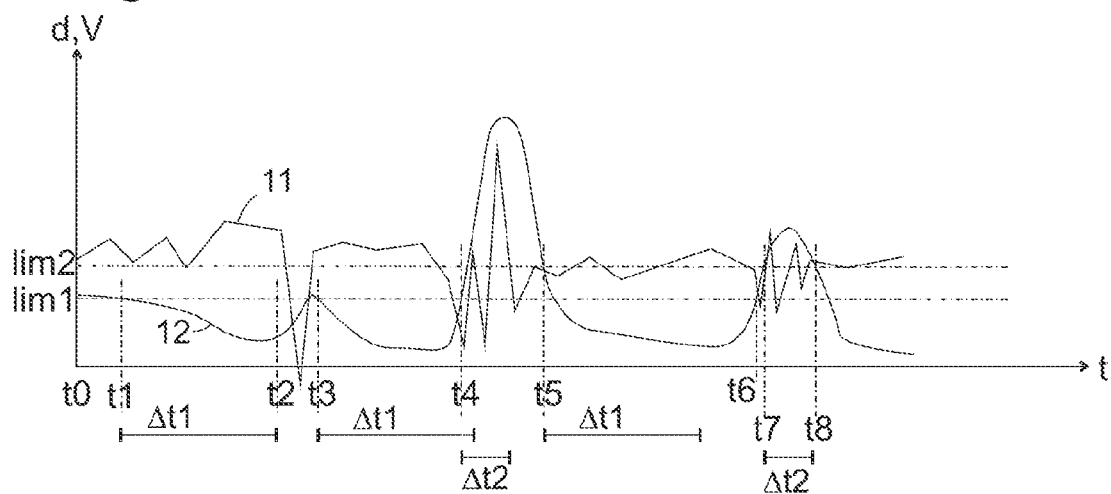
FIG. 2 shows an exemplary time profile of values of the distance and the variance.

FIG. 2 shows an example time behavior of measured values of the vehicle position in the lane transverse direction d and the time behavior of the variance V of the vehicle position derived therefrom. For better distinguishability the curve 11 of the measured vehicle positions in FIG. 2 is shown as a sequence of line segments and a time behavior of the variance V derived therefrom is shown as a continuously curved curve 12. In practice, with higher time resolution than that shown in FIG. 2, both curves 11, 12 would be identifiable as step functions as a result of the temporally discrete obtaining and evaluation of the images.

In a time interval [t0, t2] the position d fluctuates slowly and with small amplitude and the variance V decreases gradually. At a time t1 it falls below a lower limiting value lim1. The time interval [t1, t2] in which the variance V remains below the limiting value lim1 is slightly longer than a significance threshold AU so that the time interval [t1, t2] is assessed as a time span of regular steering activity. A short-term severe change in position in the time interval [t2, t3] which, for example, can be attributed to a driver intentionally cutting a corner, causes a short-term new increase of the variance V above the limiting value lim1. Gentle steering activity in the time interval [t3, t4] is not assessed as a time span of regular steering activity because the time interval [t3, t4] is slightly shorter than the significance threshold Δt1.

Several severe fluctuations of the position d in the time interval [t4, t5] have the result that the variance V exceeds an upper limiting value lim2 for a time span that is longer than a second significance threshold Δt2. The severe deflections of the position in this time interval [t4, t5] indicate that the reaction time of the driver is lengthened due to fatigue so that he allows greater positional fluctuations and must counter these by violent counter steering. From t5 to t6 a time interval of normal steering activity again follows, which is longer than the significance threshold Δt1 and therefore counted as a time span of regular steering activity. Deficient driver attentiveness from time t7 again leads to positional fluctuations which certainly do not have such a large amplitude as in time interval [t4, t5] but have a high speed which again has the result that the variance exceeds the upper limiting value lim2 for a time span above the significance threshold Δt2. Since normal gentle steering activity has been detected twice and violent steering activity has been detected twice within the time span shown in the diagram, the onboard computer 8 concludes deficient driver attentiveness and generates a warning of a visual or acoustic nature for the driver.

The monitoring method executed by the onboard computer 8 is explained in detail with reference to the flow diagram in FIG. 3. The process steps shown in FIG. 3 are repeated at regular intervals. Each iteration of the method begins with the recording of images 51 by the camera 7, or a single image by a single camera. In step 2 pattern recognition methods are used to identify at least one boundary 5 or 6 in the recorded images and the distance d between a reference point of the vehicle 1 such as the longitudinal central plane 9 and the identified boundary 5 or 6 or a reference point of the lane 3 such as the center line 10 derived by reference to the identified boundaries 5, 6 is estimated in step S3.

Step S4 includes the updating of the variance V of the position measurements. Such an updating can be made in various ways. One possible approach is to calculate a sliding mean $\bar{d}_i$ of the position d of the vehicle by adding, in each iteration, the new measured value $d_i$ of the position to the sliding mean $\bar{d}_{i-1}$ obtained in the preceding iteration and multiplying the result by a predefined forgetting factor $(1-\epsilon)$ which is a real number <1:

$$\bar{d}_i = (\bar{d}_{i-1} + d_i)(1-\epsilon)$$

In a next step the square of the deviation between the current position value $d_i$ and the sliding mean $\bar{d}_i$ is calculated, the result is added to a sliding variance $V_{i-1}$ and the result is again multiplied by the forgetting factor $(1-\epsilon)$ in order to obtain the current value of the variance $V_i$:

$$V_i = (V_{i-1} + (d_i - \bar{d}_i)^2)(1-\epsilon)$$

Another possibility for estimating the variance $V_i$ is to keep saved respectively one predefined number n of measured values $d_i, d_{i-1}, \ldots, d_{i-n}$ from the most recent iteration in each case, calculate the mean from these position values $d_i, d_{i-1}, \ldots, d_{i-n}$ by adding and dividing the result by n:

$$\bar{d}_i = \frac{1}{n}\sum_{j=i-n}^{i} d_j$$

and then square the difference between each saved position value $d_i, d_{i-1}, \ldots, d_{i-n}$ and the mean $\bar{d}_i$, add the squares and divide the result by n:

$$V_i = \frac{1}{n}\sum_{j=i-n}^{i} (d_j - \bar{d}_i)^2$$

In step S5 it is checked whether the variance has fallen below the limiting value lim1 since the preceding iteration. If yes, a timer Timer1 is started in step S6. If, on the other hand, the variance has increased above lim1 (step S7), Timer1 is stopped in step S8 and reset.

Similarly in steps S9 to S12, the ratio of the variance is examined with respect to a second higher limiting value lim2 and a timer Timer2 is started in the event of an increase above the limiting value lim2 and reset in the event of a drop. The limiting values lim1, lim2 can be fixedly predefined constants. They can, however, also be predefined as functions of the vehicle speed and/or the width of the lane 3 estimated by the onboard computer and therefore be time-variable, where in the latter case the limiting values are functions which decrease with the speed and increase with the lane width.

In step S13 it is checked whether Timer1 has reached or exceed the significance threshold Δt1. If yes, the present time is saved in a list Liste1 (S14) and Timer1 is stopped and reset. In step S15, Liste1 is checked to see whether it contains times which lie further behind than a predefined observation time. If the list contains such a time, it is deleted. In a corresponding manner, in steps S16 to S18 it is checked whether the time measured by Tmer2 has exceeded the significance threshold Δt2, if necessary the time is saved in a list Liste2 and Liste 2 is cleared of times lying further back than the observation time. In step S19 it is checked whether the number of elements of each list exceeds a predefined minimum value n1 or n2. If no exceeding of the limiting value or only one exists, the method returns to the beginning and the next images from the camera are awaited. If both limiting values n1, n2 are exceeded, a warning is issued to the driver in step S20.

The observation time expediently extends over a time span of several minutes. The significance thresholds Δt1, Δt2 can lie in a range of several seconds to several tens of seconds where Δt2 is generally selected to be shorter than Δt1. The threshold values n1, n2 are small natural numbers, preferably 2 or more.

A further development of the method enables an automatic adaptation of the method to the driving style of the driver. In this further development it is assumed that immediately after starting the vehicle, the probability of the driver being inattentive is low. Accordingly, the variance V of the vehicle position d during a limited time span after starting, e.g. 15 or 30 min long, is measured and the value of the variance thus obtained plus a first safety margin is set as limiting value lim1. The second limiting value lim2 is set as being a predefined factor higher than the first. It can thus be ensured that in each case limiting values adapted to the personal reaction capacity of the driver are used and unnecessary warnings are avoided.

FIG. 4 shows a flow diagram of a second embodiment of a method according to the invention. Unlike in the first embodiment, the observation time here does not have a fixed length but depends on the results of the position monitoring as will become clearer in the following. Steps S1 to S3 with which the method begins are the same as in the method of FIG. 3 and are therefore not described again. A first timer is started here in step S4' in direct temporal relationship to the first position measurement at value zero. In step S5' it is checked whether the deviation of the distance value obtained in the preceding step S3 from a mean which can be obtained as described with reference to step S4 in FIG. 3, stays below a first limiting value lim1. If yes, steps S1 to S3 and S5' are repeated after a predefined waiting time while the timer Timer1 measures the time elapsed since its start S4'.

If an exceeding of the limiting value lim1 is identified in step S5', the method goes over to step S6' in which the time measured by the timer Timer1 is compared with the significance threshold Δt1. If the time measured by the timer Timer1 is shorter than Δt1, the method goes back to the beginning. If the measured time is longer than Δt1, a significant period with good track precision is deemed to be detected and a second timer Timer2 is started in step S7'. In a following step S8' it is checked whether the measured value of the timer Timer2 has exceeded a second significance threshold Δt2. As long as this is not the case, steps S1 to S3 are repeated in order to obtain a new distance estimate and compare with deviation from the mean in step S9' with the second limiting value lim2. As long as this deviation is smaller than the limiting value lim2, the method goes back to step S8'. If this occurs sufficiently frequently, the second timer Timer2 finally exceeds the significance threshold Δt2, i.e. a time interval of length Δt2 has elapsed in which no striking position deviation of more than lim2 has occurred. In this case, a counter is set to zero in step S10', whose function is explained in further detail in the following, and the method goes back to the starting point. One observation period thus ends and another begins.

If on the other hand, in step S9', an exceeding of the limiting value lim2 is registered before the time Δt2 has expired, in step S11' the counter is incremented and in step S12' it is checked whether the counter status is greater than 1. This case occurs if firstly a time interval of good track precision having a length at least equal to the first significance threshold Δt1 and then a severe position deviation of more than lim2 in a time interval of no more than Δt1 after the end of this time interval has been recorded twice in succession within an observation time. If this is the case, it is assumed that the violent position deviations can in fact be attributed to deficient attentiveness of the driver and in step S13' a warning is given to the driver.

The two embodiments of the method according to the invention described with reference to FIG. 3 and FIG. 4 can be combined with one another, in particular in such a manner that for detecting a period having small position deviations steps S1 to S6' of the method from FIG. 4 are replaced by steps S1 to S8 and S13 from FIG. 3, a period of small position deviations is therefore identified by means of a monitoring of the variance whereas for the detection of a significant period having large position deviations the detection of a single deviation >lim2 as in step S9' is sufficient.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for assessing an attentiveness of a driver of a motor vehicle traveling in a lane comprising:
    detecting a position of the motor vehicle in the lane transverse to a direction of travel;
    determining an extent of fluctuations of the position; and
    assessing the attentiveness as insufficient if within an observation period a first significant period in which the extent of fluctuations of the position falls below a first low limiting value and a second significant period is detected in which the extent of fluctuations exceeds a second high limiting value, and
    wherein the first significant period is assessed as significant if a first duration of the first significant period exceeds a first significance limiting value; and
    wherein the second period is assessed as significant if a second duration of the second period exceeds a second significance limiting value.

2. The method according to claim 1, further comprising calculating a variance of the position as a benchmark of the extent of fluctuations at least for a comparison with the first low limiting value.

3. The method according to claim 1, wherein the first significant period is assessed as significant if a time between the beginning of a period and a second time at which a deviation exceeds the second high limiting value is shorter than a second significance limiting value (Δt2).

4. The method according to claim 1, wherein the assessing the attentiveness as insufficient if a number of significant first periods within the observation period is at least two.

5. The method according to claim 1, wherein an observation period ends when a time interval adjoining a significant first time interval does not satisfy a criteria for a significant second period.

6. The method according to claim 1, further comprising recording images of the lane to detect the position of the motor vehicle with an at least one camera carried with the motor vehicle.

7. The method according to claim 6, further comprising using one lane boundary as a reference for detecting the position of the motor vehicle.

8. The method according to claim 7, further comprising:
    determining a lane center using a right lane boundary and a left lane boundary; and
    using the lane center as the reference to detect the position of the motor vehicle.

9. The method according to claim 1, further comprising determining the second high limiting value using a motor vehicle speed.

10. A non-transitory computer readable medium embodying a computer program product, said computer program product comprising:
    an assessment program for assessing an attentiveness of a driver of a motor vehicle traveling in a lane, the assessment program configured to:
    detect a position of the motor vehicle in the lane transverse to a direction of travel;
    determine an extent of fluctuations of the position relative to the lane transverse to the direction of travel; and
    assess the attentiveness as insufficient if within an observation period a first significant period in which the extent of fluctuations of the position falls below a first low limiting value and a second significant period is detected in which the extent of fluctuations exceeds a second high limiting value;
    wherein the first significant period is assessed as significant if a first duration of the first significant period exceeds a first significance limiting value; and
    wherein the second period is assessed as significant if a second duration of the second period exceeds a second significance limiting value.

11. The non-transitory computer readable medium embodying the computer program product according to claim 10, the assessment program further configured to calculate a deviation of the position from a mean value as a benchmark of the extent of fluctuations at least for comparison with the second high limiting value.

12. The non-transitory computer readable medium embodying the computer program product according to claim 10, wherein the second period is assessed as significant if a time between the beginning of a period and a second time at which a deviation exceeds the second high limiting value is shorter than a second significance limiting value (Δt2).

13. The non-transitory computer readable medium embodying the computer program product according to claim 10, wherein the assessing the attentiveness as insufficient if a number of significant second periods within the observation period is at least two.

14. The non-transitory computer readable medium embodying the computer program product according to claim 10, the assessment program further configured to generate a warning for the driver if the attentiveness is assessed as insufficient.

15. The non-transitory computer readable medium embodying the computer program product according to claim 10, the assessment program further comprising:
   identify at least one lane boundary in images; and
   estimate a distance of the motor vehicle from the at least one lane boundary.

16. The non-transitory computer readable medium embodying the computer program product according to claim 15, the assessment program further configured to identify a right lane boundary and a left lane boundary in the images.

17. The non-transitory computer readable medium embodying the computer program product according to claim 13 the assessment program further configured to:
   estimate a lane width using a right lane boundary and a left lane boundary; and
   determine the first low limiting value using the lane width.

\* \* \* \* \*